(12) United States Patent　(10) Patent No.: US 9,052,035 B2
Hutchings　(45) Date of Patent: Jun. 9, 2015

(54) SHAFT LOCKING DEVICE

(71) Applicant: AIRBUS OPERATIONS LIMITED, Bristol (GB)

(72) Inventor: Job Telford Kingdom Hutchings, Bristol (GB)

(73) Assignee: Airbus Operations Limited, Bristol (GB)

( * ) Notice: Subject to any disclaimer, the term of this patent is extended or adjusted under 35 U.S.C. 154(b) by 193 days.

(21) Appl. No.: 13/716,476

(22) Filed: Dec. 17, 2012

(65) Prior Publication Data

US 2013/0153802 A1　Jun. 20, 2013

(30) Foreign Application Priority Data

Dec. 15, 2011　(GB) .................................. 1121604.1

(51) Int. Cl.
*F16K 35/06*　(2006.01)
*F16K 31/44*　(2006.01)
*F16K 35/10*　(2006.01)
*G05G 5/06*　(2006.01)

(52) U.S. Cl.
CPC ........... *F16K 31/44* (2013.01); *Y10T 74/20636* (2013.01); *F16K 35/06* (2013.01); *F16K 35/10* (2013.01); *G05G 5/06* (2013.01)

(58) Field of Classification Search
USPC ............... 251/90, 92, 93, 101, 102, 103, 104, 251/105, 106; 137/385, 269, 270; 70/175, 70/176, 177, 178, 179, 180, 182, 183, 187
See application file for complete search history.

(56) References Cited

U.S. PATENT DOCUMENTS 292,824 A * 2/1884 Kennedy ....................... 251/288
6,276,662 B1 * 8/2001 Bugatti ........................... 251/95
6,817,796 B1 11/2004 Hurd

FOREIGN PATENT DOCUMENTS

DE　25 31 896　5/1977
EP　0 243 883　4/1987
EP　1 411 272　4/2004
EP　1 479 957　11/2004

OTHER PUBLICATIONS

Search Report for UK 1121604.1 dated Apr. 13, 2012.
Extended European Search Report dated Mar. 26, 2013 in EP 12195279.0-1751.

* cited by examiner

*Primary Examiner* — John K Fristoe, Jr.
*Assistant Examiner* — Jonathan Waddy
(74) *Attorney, Agent, or Firm* — Nixon & Vanderhye P.C.

(57) ABSTRACT

The present application relates to a shaft locking device. The device has an locking element configured to be mounted on a shaft in a first position so that the locking element indicates the angular position of the shaft. The locking element is also configured to be mounted on a shaft in a second position so that the locking element is locatable against a stop to prevent rotation of the shaft. The present application also relates to a device for determining the angular position of a shaft, a valve assembly and an actuating unit for a valve.

18 Claims, 3 Drawing Sheets

SHAFT LOCKING DEVICE

This application is claims priority to UK Patent Application No. 1121604.1 filed 15 Dec. 2011, the entire contents of which is hereby incorporated by reference.

The present invention relates to a shaft locking device. The present application also relates to a device for determining the angular position of a shaft. Furthermore, the present application also relates to a valve assembly and an actuating unit for a valve.

In an aircraft there is a need to control the flow of fuel and other fluids along fluid passageways. This flow control is generally carried out by means of one or more valves which are movable between an open condition, in which a fluid is able to flow through a valve, and a closed condition in which a fluid is prevented from flowing through a valve.

Such a valve has a rotating element which is operated by a drive unit, for example a motor, to actuate it between its open and closed conditions. The drive unit actuates the rotating element of a valve by means of a rotating shaft which communicates between therebetween to open and close the valve.

In some circumstances, for example during maintenance, it is necessary to prevent operation of a valve so that it is locked in one condition, such as a closed condition. This is generally achieved by removing the drive unit and replacing it with a locking unit which extends over the shaft and body of the valve unit to prevent the shaft from rotating relative to the valve unit so that the rotating element of the valve is maintained in a predetermined position. The locking unit is generally carried on an aircraft with such a valve, or is supplied at a location where locking of the valve in a set condition is required.

The present invention seeks to provide a shaft locking device, a device for determining the angular position of a shaft, a valve assembly and/or an actuating unit for a valve which overcomes or substantially alleviates the problems and disadvantages of the devices described above.

According to embodiments of the present invention, there is provided a shaft locking device, comprising a locking element configured to be mounted on a shaft in a first position so that the locking element is free to rotate with the shaft, wherein the locking element is configured to be mounted on a shaft in a second position so that the locking element is locatable against a stop to prevent rotation of the shaft.

Advantageously, the locking element may comprise a shaft mounting collar to mount the locking element in the first position.

Conveniently, the shaft mounting collar is a first shaft mounting collar, and the locking element may further comprise a second shaft mounting collar to mount the locking element in the second position.

The shaft locking element may comprise a locking portion configured to locate against a stop to prevent rotation of the shaft.

Conveniently, the radial distance from the rotational axis of a shaft to the locking portion when the locking element is in its first position is less than the radial distance from the rotational axis of a shaft to the locking portion when the locking element is in its second position.

The first shaft mounting collar may be disposed on an opposing side of the first shaft mounting collar to the locking portion.

The shaft locking element may comprise a body forming the first and second shaft mounting collars, and the locking portion may extend from the collar.

Conveniently, the distance between the locking portion and a first shaft mounting aperture may be less than the distance between the locking portion and the second shaft mounting aperture.

Advantageously, the locking portion is an indicator element configured to indicate the angular position of a shaft when the locking element is in its first position.

In one embodiment, the first shaft mounting collar comprises a rotation prevention element which may be configured to prevent rotation of a shaft relative to the locking element when the locking element is mounted on a shaft in its first position.

Advantageously, the second shaft mounting collar may comprise a rotation prevention element which may be configured to prevent rotation of a shaft relative to the locking element when the locking element is mounted on a shaft in its second position.

The and/or each rotation prevention element may be a spline.

According to another aspect of embodiments of the present invention, there is provided a device for determining the angular position of a shaft comprising a shaft locking device.

Advantageously, the locking element is configured to act as an indicator element to indicate the angular position of a shaft when the locking element is mounted to a shaft in a first position.

According to another aspect of embodiments of the present invention, there is provided an actuating unit for actuating a valve comprising a drive unit, a rotatable shaft for actuating a valve and a shaft locking device.

According to another aspect of embodiments of the present invention, there is provided a valve assembly comprising a valve, a shaft for actuating the valve and a shaft locking device.

According to another aspect of embodiments of the present invention, there is provided a valve assembly comprising a valve, a shaft for actuating the valve, a locking element mountable to the shaft and a stop, wherein the locking element is configured to be mounted on the shaft in a first position so that the locking element is free to rotate with the shaft, and is configured to be mounted to a shaft in a second position so that the locking element is locatable against the stop to prevent rotation of the shaft and maintain the valve in a pre-determined operating position.

The valve assembly may comprise a housing, wherein the stop is formed on the housing.

The stop may be a slot formed in the housing.

The stop may comprise a lug against which the locking element is locatable.

The valve assembly may further comprise an drive unit to drive the shaft.

Conveniently, the stop is a first stop and the locking element may be configured to locate against a first stop to prevent rotation of the shaft and maintain the valve in a first pre-determined operating position, the valve assembly further comprising a second stop, wherein the locking element is configured to locate against the second stop to prevent rotation of the shaft and maintain the valve in a second pre-determined operating position.

The locking element and the shaft may have corresponding splines which engage with each other to prevent rotation of the shaft relative to the locking element.

Conveniently, the locking element is slidable along the shaft in an axial direction to disengage from the shaft so that the locking element is movable between the first and second positions.

Embodiments of the invention will now be described, by way of example only, with reference to the accompanying drawings, in which.

Figure 1:
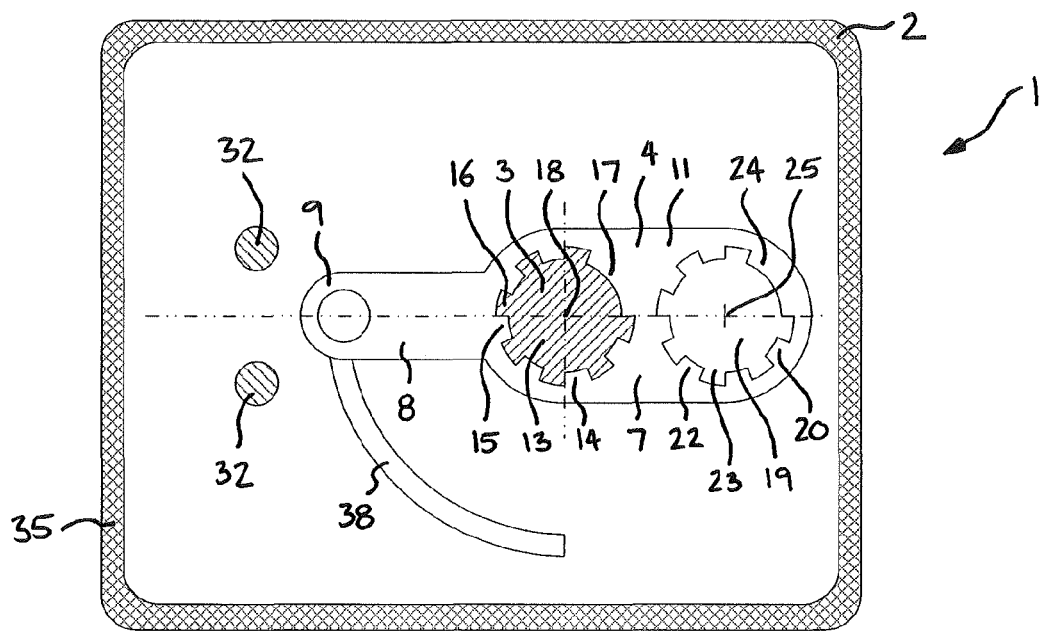
FIG. 1 shows a diagrammatic cross-sectional view of one embodiment of a valve assembly with an locking element in a first position.

Referring now to the drawings, a cross-sectional view of a valve assembly 1 is shown. The valve assembly 1 comprises a housing 2, a drive shaft 3 and a locking element 4 mounted on the shaft 3, forming part of a shaft locking device, which is configured to prevent rotation of the shaft 3, as will become apparent hereinafter.

In the present embodiment, the shaft locking device is integrally formed with a device for determining the angular position of the shaft 3. However, it will be appreciated that the shaft locking device may be used independently of a means for determining the angular position of the shaft, as will be explained in detail hereinafter.

Figure 6:
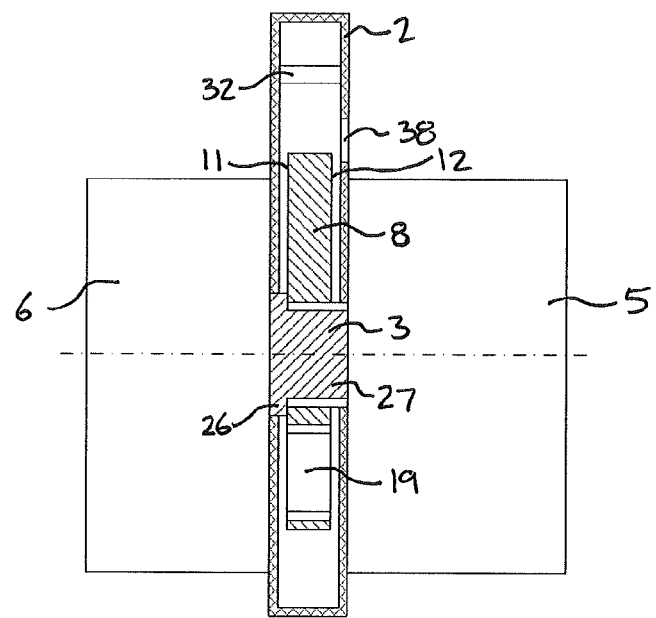
FIG. 6 shows a diagrammatic cross-sectional view of the valve assembly including an locking element in a first position as shown in FIG. 1.
Figure 7:
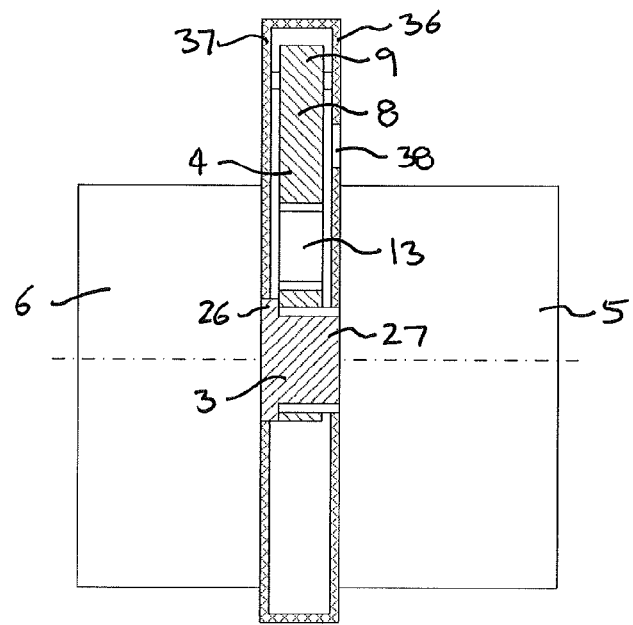
FIG. 7 shows a diagrammatic cross-sectional view of the valve assembly including an locking element in a second position as shown in FIG. 5.

The drive shaft 3 is engaged with and communicates between a drive unit 5 (refer to FIGS. 6 and 7) and a valve unit 6 (refer to FIGS. 6 and 7). In the present embodiment the drive shaft 3 forms part of and extends from the valve unit 6 to engage with the drive unit 5, however it will be appreciated that in an alternative embodiment, the drive shaft 3 forms part of and extends from the drive unit 5 to engage with the valve unit 6. Alternatively, the shaft 3 extends between and engages with both the drive and valve units 5, 6, or is formed from a drive portion extending from the drive unit 5 and a valve portion extending from the valve unit 6 which fixedly engage with each other.

The valve unit 6 is a rotary flow control valve, or globe valve, having a valve element (not shown) that rotates to move the valve unit 6 from a closed condition, in which a fluid is able to flow through the valve unit, and an open position, in which a fluid is prevented from flowing through the valve unit. The shaft 3 acts on the valve element (not shown) when it is actuated by the drive unit 5 to rotate the valve element. However, it will be appreciated that the valve unit 6 is not limited thereto, and may be an alternative type of valve. The drive unit 5 is a motor, however it will be appreciated that other drive means may be used.

Figure 4:
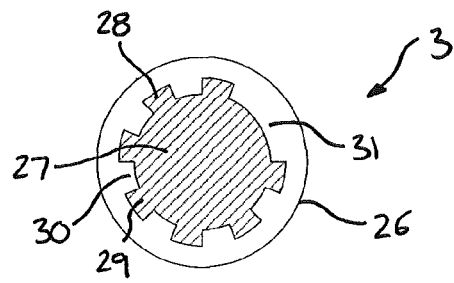
FIG. 4 shows a diagrammatic cross-sectional view of a drive shaft on which the locking element shown in FIG. 3 is mountable.

The shaft locking device is shown in FIG. 4 and comprises the locking element with an elongate body 7 and a locking portion 8. The locking portion 8 is a locking member and also acts as an indicator member, as will become apparent hereinafter. The locking member 8 is elongate and extends from the elongate body 7, on the longitudinal axis of the elongate body 7. A free end 9 of the locking member 8 is defined at a distal end of the locking member 8 to the body 7. The elongate body 7 and locking member 8 are integrally formed and are formed from, for example, a molded plastic or cast aluminium. The body 7 has opposing side faces 11, 12 (refer to FIGS. 6 and 7).

A first shaft receiving aperture 13, acting as a first shaft mounting collar, is formed through the body 7 between its opposing side faces 11, 12. In the present embodiment, the first shaft mounting collar is an aperture extending circumferentially around a shaft when mounted thereto, although the arrangement of the first shaft mounting collar is not limited thereto. A spline 14, acting as a rotation prevention element, is formed on the inner surface of the first shaft receiving aperture 13 and is formed as a plurality of ridges 15 interspersed by grooves 16. The arc of one ridge 17 is greater than the arc of the other ridges to form an alignment element, which provides an alignment means to allow the locking element 4 to be orientated on the shaft 3 in the correct angular orientation when the shaft is received through the first shaft receiving aperture 13, as will become apparent hereinafter. The centre line 18 of the first shaft receiving aperture 13 is disposed on the longitudinal axis of the body 7 and locking member 8.

A second shaft receiving aperture 19, acting as a second shaft mounting collar, is formed through the body 7 between its opposing side faces 11, 12. In the present embodiment, the second shaft mounting collar is an aperture extending circumferentially around a shaft when mounted thereto, although the arrangement of the second shaft mounting collar is not limited thereto. A spline 20, acting as a rotation prevention element, is formed on the inner surface of the second shaft receiving aperture 19 and is formed as a plurality of ridges 22 interspersed by grooves 23. The arc of one ridge 24 is greater than the arc of the other ridges to form an alignment element, which provides an alignment means to allow the locking element 4 to be orientated on the shaft 3 in the correct angular orientation when the shaft is received through the second shaft receiving aperture 19, as will become apparent hereinafter. The centre line 25 of the second shaft receiving aperture 19 is disposed on the longitudinal axis of the body 7 and locking member 8.

The second shaft receiving aperture 19 is disposed on an opposing side of the first shaft receiving aperture 13 to the locking member 8 extending from the body 7. The distance between the free end 9 of the locking member 8 and the centre line 25 of the second shaft receiving aperture 19 is greater than the distance between the free end 9 of the locking member 8 and the centre line 18 of the first shaft receiving aperture 13. Although in the present embodiment the centre lines 18, 25 of the first and second shaft receiving apertures 13, 19 are disposed on the longitudinal axis of the body 7, it will be appreciated that the positions of the apertures 13, 19 in the body 7 are not limited thereto.

Referring now to FIG. 4, the drive shaft 3 has a shoulder part 26 and a locking element receiving part 27. The locking element receiving part 27 is configured to extend through and engage with the first and second shaft receiving apertures 13, 19 so that the locking element 4 is mounted to the drive shaft 3. The side face 12 of the locking element 4 locates against the shoulder part 26 when the locking element 4 is received on the shaft 3.

Figure 5:
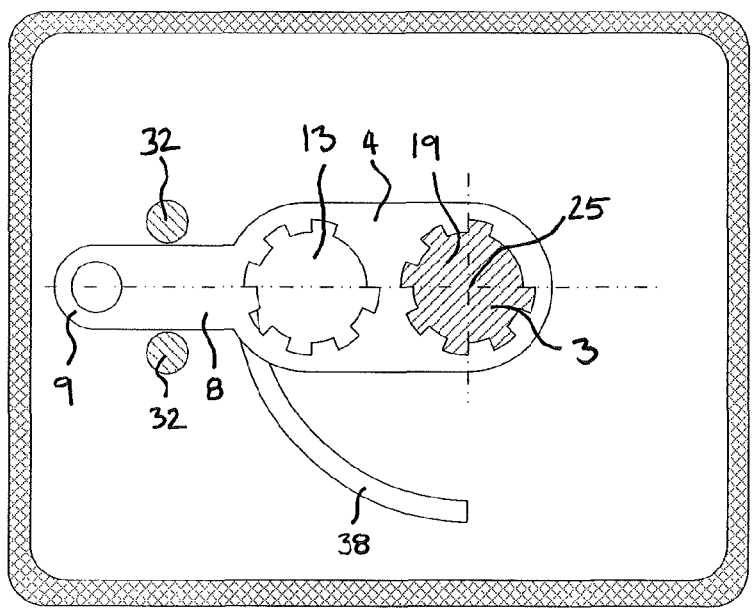
FIG. 5 shows a diagrammatic cross-sectional view of the valve assembly shown in FIG. 1 with the locking element in a second position.

A spline 28, acting as a rotation prevention element, is formed on the outer surface of the locking element receiving part 27 of the drive shaft 3. The spline 28 is formed as a plurality of ridges 29 interspersed by grooves 30. The ridges 29 extend axially along the shaft 3. The spline 28 on the drive shaft 3 forms a male spline which meshes with and mechanically engages with the spline 14 formed on the inner surface of the first shaft receiving aperture 13 (as shown in FIGS. 1 and 2), or the spline 20 formed on the inner surface of the second shaft receiving aperture 19 (as shown in FIG. 5). The arc of one groove 31 is greater than the arc of the other grooves to form an alignment element. The arc of the alignment groove 31 forming the alignment element corresponds to the arc of the alignment ridges 17, 24 forming the alignment elements on the inner surface of the first and second shaft receiving apertures 13, 19 to provide an alignment means to allow the locking element 4 to be orientated on the shaft 3 in the correct angular orientation when the shaft is received through the first and second shaft receiving apertures 13, 19.

When the shaft 3 is received through either of the first and second shaft receiving apertures 13, 19 of the locking element 4, the locking element 4 is prevented from rotating about the shaft 3 due to the splines 14, 20, 28 forming a locking arrangement. Therefore, the angular position of the locking element 4 on the shaft 3 is prevented from changing. The alignment means formed by the alignment ridges 17, 24 and the alignment groove 31 ensures that the locking element 4 is disposed on the shaft in the same angular position. This ensures that the locking element, acting as an indicator element, accurately displays the condition of the valve and allows a user to determine whether the valve is in it open, closed or partially open position. Although the alignment means is formed by alignment ridges 17, 24 on the inner surfaces of the apertures 13, 19 and the alignment groove 31 on the shaft 3 in the present embodiment, it will be appreciated that alignment grooves may be formed on the inner surfaces of the apertures 13, 19 which corresponds to an alignment ridge on the shaft 3. Alternatively, a different alignment arrangement may be used to ensure that the locking element is disposed on the shaft in a predetermined orientation.

Although the spline of the drive shaft and corresponding splines of the first and second shaft mounting collars of the locking element are formed from a plurality of ridges in the present embodiment, it will be understood that the splines 14, 20, 28 may comprise a key and keyway arrangement (not shown). An advantage of a key and keyway arrangement is that is enables easier alignment of the locking element on the shaft in the correct orientation as it is simpler to identify the corresponding positions of the key and key way. However, an advantage of the the plurality of ridges is that the fatigue life of the components are maximised.

Figure 2:
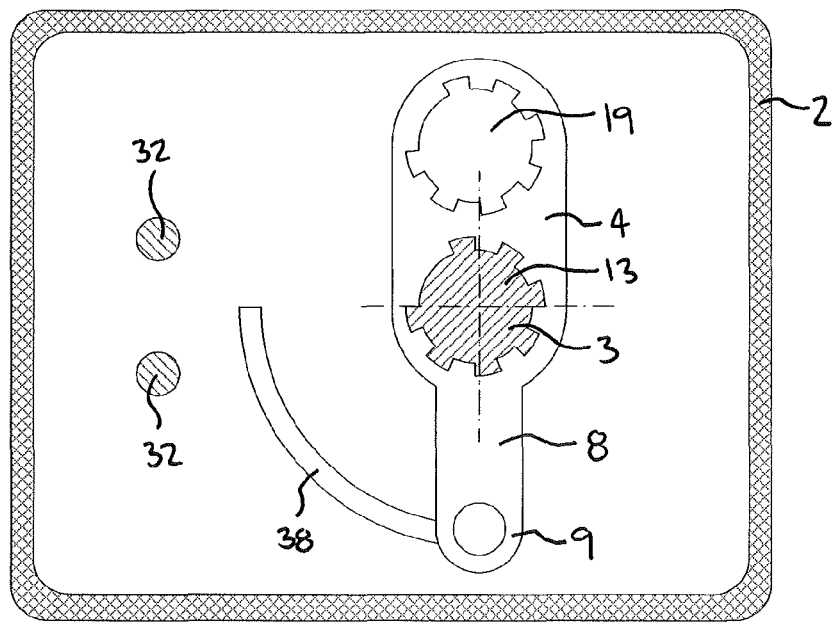
FIG. 2 shows another diagrammatic cross-sectional view of the embodiment of a valve assembly shown in FIG. 1.
Figure 3:
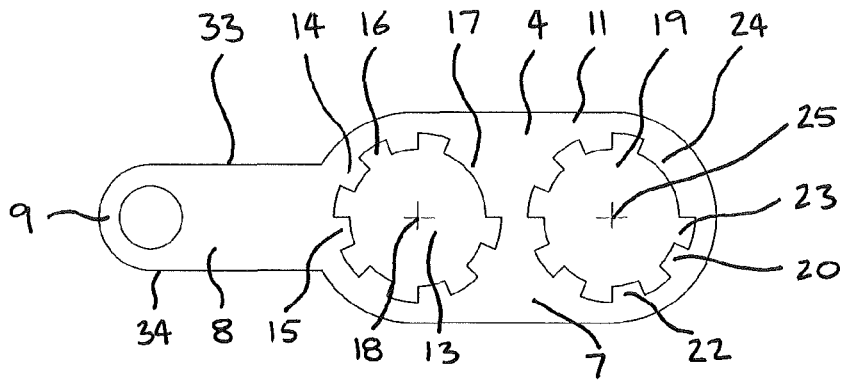
FIG. 3 shows a diagrammatic plan view of the locking element shown in FIG. 1.

The locking element 4 is disposable on the shaft 3 in two positions. In a first position, as shown in FIGS. 1, 2 and 6, the locking element 4 is disposed on the shaft 3 so that the shaft is received through and engages with the first shaft receiving aperture 13. In a second position, as shown in FIGS. 5 and 7, the locking element 4 is disposed on the shaft 3 so that the shaft 3 is received through and engages with the second shaft receiving aperture 19.

Two rods or lugs 32, acting as stops, extend in the housing 2. The spacing between the two lugs 32 corresponds to the width of the locking member 8 between two edges 33, 34. The longitudinal axis of each lug 32 extends parallel to the rotational axis of the drive shaft 3. The midpoint between the two lugs 32 lies on the longitudinal axis of the locking element 4 when the locking element 4 is mounted to the shaft 3 and the drive shaft 3 is rotated so that the valve 3 is in a closed condition, as will become apparent hereinafter.

The housing 2 is formed from two parts (not shown) which are separable to allow the locking element 4 to be moved from its first position, in which the shaft 3 is received through the first shaft receiving aperture 13, to its second position, in which the shaft 3 is received through the second shaft receiving aperture 19. An outer shell 35 comprises first and second walls 36, 37 (refer to FIGS. 6 and 7) which extend parallel to each other. An arcuately-shaped viewing aperture 38 is formed through the first wall 36 and extends along an arc of 90 degrees. The viewing aperture 38 follows the path of the free end 9 of the locking member 8, acting as an indicator element, as the locking element 4 is rotated about the rotational axis of the shaft 3 together with the shaft 3 in the housing 2.

In the present embodiment, the housing 2 is independent of the valve unit 6 and the drive unit 5 and is fixedly mounted therebetween. However, alternatively the housing 2 is formed as part of the drive unit 5 or the valve unit 6. It will also be appreciated that the housing 2 may form part of the valve and drive units. One wall of the housing may be formed by one of the valve or drive units, so that when the valve unit or drive unit and the housing are separated, the locking element is movable between its first and second positions.

Operation of the above-described embodiment of the valve assembly 1 will now be described with reference to FIGS. 1 to 7.

The valve assembly is initially assembled in its operational state, with the locking element 4 mounted to the shaft 3 and received in the housing 2, and the shaft communicating between the drive unit 5 and the valve unit 6, so that the valve unit 6 is mechanically engaged with the drive unit 5. In the operational state the locking element 4, acting as an indicator element, is arranged to indicate the angular position of the shaft 3 about its axis. That is, the locking element 4 is mounted to the shaft in its first position, as shown in FIG. 1, with the shaft 3 received through and engaged with the first shaft receiving aperture 13.

The locking element 4 is disposed between the side walls 36, 37 of the housing shell so that the locking element 4 is retained in its first position and cannot be dismounted from the shaft 3. The corresponding splines 14, 28 of the first shaft receiving aperture 13 and the shaft 3 engage with each other so that the locking element 4 is prevented from rotating about the shaft 3.

The orientation of the locking element 4 on the shaft 3 is determined by the alignment means 17, 31 so that the locking element 4 can only be assembled on the shaft in its first position in one orientation. Therefore, the locking element 4 is able to act as an indicator element and is disposed on the shaft in one orientation to show the angular position of the shaft 3. When the valve unit 6 is in its closed condition, the locking member 8, acting as an indicator member, of the locking element 4 extends at a predetermined angle in the housing 2 and is visible to a user through the arcuately-shaped viewing aperture 38 at one end of the viewing aperture 38, as shown in FIG. 1. Therefore, it is apparent to a user that the valve unit 6 is in a closed condition.

The distance between the centre line 18 of the first shaft receiving aperture 13 and the free end 9 of the locking member 8 is less than the the distance between the rotational axis of the shaft 3, which is coaxial with the centre line 18 of the first shaft receiving aperture 13 in the first position, and the lugs 32, acting as the stop, and so the locking element 4 is free to rotate together with the shaft 3 in the housing 2 without locating against the lugs 32.

When the drive unit 5 is operated, the drive unit 5 acts on the shaft and urges the shaft to rotate about its rotational axis (anti-clockwise in FIG. 1). The shaft acts on the valve unit 6 and urges the valve element (not shown) of the valve unit 6 to rotate so that the valve unit 6 moves from a closed condition to an open condition. The shaft 3 is urged to rotate through an angle of 90 degrees so that the valve unit 6 moves into it fully open condition. As the shaft 3 rotates, the locking element 4 rotates with the shaft 3, because the locking element is fixedly mounted to the shaft 3. The locking element 4 is guided between the side walls 36, 37 of the housing. The position of the free end 9 of the locking member 8 is visible through the arcuately-shaped viewing aperture 38 and so acts as an indicator member.

When the shaft 3 has moved the valve unit 6 into its open condition the locking element 4 is rotated with the shaft 3 into the position shown in FIG. 2. A user is therefore able to determine that the valve unit 6 is in its fully open condition.

To move the valve unit 6 into its closed position, the drive unit 5 acts on the shaft 3 and urges it to rotate in the opposite direction about its rotational axis (clockwise in FIG. 1). The shaft acts on the valve unit 6 and urges it into its closed condition. As the shaft 3 rotates, the locking element 4 rotates with the shaft 3, because the locking element is fixedly mounted to the shaft 3, and the locking element 4 returns to the position shown in FIG. 1. Therefore, it is easy for a user to determine the operating condition of the valve at all times.

In the event that it is necessary to maintain the valve unit in a set condition, for example in the present embodiment to retain the valve unit 6 in a closed condition during maintenance, the locking element 4 is moved from its first position to its second position. The housing, or part of the housing, is removed and the locking element 4 is dismounted from the shaft 3 and re-mounted to the shaft 3 in its second position, in which the shaft 3 is received through and engages with the second shaft receiving aperture 19, as shown in FIG. 5. The corresponding splines 20, 28 of the second shaft receiving aperture 19 and the shaft 3 engage with each other so that the locking element 4 is prevented from rotating about the shaft 3.

The distance between the centre line 25 of the second shaft receiving aperture 19 and the free end 9 of the locking member 8 is greater than the the distance between the rotational axis of the shaft 3, which is coaxial with the centre line 25 of the second shaft receiving aperture 19 in the second position, and the lugs 32, acting as the stop. Therefore, when the locking element 4 is in its second position, the free end 9 of the locking member 8 is received between the two lugs 32, which act as a stop, and the locking member 8 is prevented from rotating about the rotational axis of the shaft 3 by the free end 9 of the locking element 8 locating against the lugs 32. The shaft 3 is engaged with the locking element 4, and so the shaft 3 is prevented from being rotated about its rotational axis. Therefore, the valve unit 6 is maintained in its closed condition. It will be appreciated that the locking element is able to be used to prevent rotation of a continuous rotation shaft or a partial rotation shaft, for example between two predetermined positions.

The orientation of the locking element 4 on the shaft 3 is determined by the alignment elements 24, 31 so that the locking element 4 can only be assembled on the shaft in its second position in one orientation. Therefore, when the free end 9 is received between the lugs 32, the shaft 3 must be in predetermined angular position, and so the valve unit 6 must be in a closed condition.

When the valve unit 6 is in its closed condition, the locking member 8 of the locking element 4 extends at a predetermined angle in the housing 2 and is visible to a user through the arcuately-shaped viewing aperture 38 at one end of the viewing aperture 38, as shown in FIG. 1. Therefore, it is apparent to a user that the valve unit 6 is in a closed condition.

The free end 9 is marked differently to a mid section of the locking member 8, for example in a different colour, so that a user is able to determine when the locking element 4, acting as an indicator element, is in its first position, in which the shaft 3 is free to rotate, or its second position, in which the shaft 3 is prevented from rotating. However, alternative arrangements are envisaged to determine whether the locking element 4 is in its first or second positions, for example by a viewing hole disposed between the lugs 32 so that the locking element is visible therethrough when the locking element 4 is in its second position, restricting rotation of the shaft 3. An advantage of these arrangements is that it is simple for a user to determine whether the valve is free to move into an open condition, or is restricted from doing so.

To return the valve assembly 1 to an operational state, the locking element 4 is returned from its second position to its first position. An advantage of the above arrangements is that there are no additional components required to lock the valve in a single condition. For example, the above arrangement removes the need to provide a locking plate which fixedly mounts the shaft relative to the body of the valve unit to prevent rotation of the shaft, and hence a rotating element relative to the body. Furthermore, it prevents the need to use any small components, for example a locking pin, which may be easily lost or misplaced. Furthermore, the above arrangement removes the need to supply a dedicated component or components to lock the valve in a closed (or other) position as the same component that is used to determine the angular position of the shaft is used to prevent rotation of the shaft, when necessary.

Although in the present embodiment the stop is provided by one or more lugs 32, it will be understood that an alternative stop, or stop arrangement, may be used. The stop may be any element or arrangement that prevents the locking element 4 from rotating when the locking element 4 is in its second position. For example, in another embodiment the stop is a slot (not shown) formed in the housing. Alternatively, the stop is a pin (not shown) extending from the free end 9 of the locking element 8 that locates in the viewing aperture 38 when the locking element 8 is in its first position and locates in a stop hole (not shown) formed by the housing 2 when the locking element 8 is in its second position.

Although two lugs are shown in the above-described embodiment, it will be appreciated that a single lug may be used against which the locking member 8 abuts, as will become apparent hereinafter, to prevent rotation of the locking element 4, and therefore the shaft 3, about the rotation axis relative to the lug 32. Such an arrangement will prevent rotation of the shaft when the valve is in one extreme condition, for example fully open or fully closed, and so is only able to be actuated in a single direction. Furthermore, in an alternative embodiment, two or more stops are used to enable the locking unit and shaft to be fixedly disposed in two or more angular positions so that the valve unit is lockable in two or more conditions, for example fully closed, partially open and or fully open.

In the above described embodiments the drive unit, valve unit, shaft and locking element 4 together form a valve assembly. However, it will be appreciated that the drive unit, shaft and locking element may together form a actuating unit which is mountable to a valve unit to operate the valve unit. Similarly, it will be appreciated that the shaft and locking element may form part of the valve unit which is connectable to a drive unit.

Although in the above embodiments the stop is arranged to act on the locking element to prevent rotation of the shaft, in an alternative arrangement the stop includes two stop elements which are spaced apart from each other to provide an angle of permitted rotation of the shaft. In such an arrangement the shaft is able to rotate between the locking element abutting against one stop element and the locking element abutting against another stop element.

Although in the above described embodiments the locking element is configured to be used as an indicator element, it will be appreciated that the shaft locking device is not limited thereto and that in an alternative embodiment the locking element does not act to indicate the angular position of a shaft. It will also be appreciated that the shaft locking device may be used in combination with a separate indicator means for determining the angular position of the shaft. It will also be appreciated that the locking element may have other arrangements to those described above. For example, in one embodiment the locking portion is an edge of a body with the first and second shaft receiving apertures formed therein. In another embodiment, the locking element is a circular plate, wherein the first shaft receiving aperture is formed in the centre of the plate and the second shaft receiving aperture is offset from the centre of the plate.

Although in the above described embodiments the locking element is removed from the shaft to move the locking element between its first and second positions, it will be appreciated that alternative arrangements are possible. For example, in an alternative embodiment the locking element has a slot extending between the first and second shaft receiving apertures, and the shaft has a section of reduced diameter. With this arrangement, the locking element is slid along the shaft to the section of reduced diameter and the shaft is then able to slide along the slot between the first and second shaft receiving apertures to move between its first and second positions.

Although in the above described embodiments the locking element is fixedly mounted on a section of shaft mechanically communicating between the actuating unit and a valve unit, it will be appreciated that the arrangement of the shaft locking device is not limited thereto and that a portion of a shaft may extend from an opposing side of the actuating unit or valve unit to the section of shaft mechanically communicating between the actuating unit and a valve unit, and in such an arrangement the locking element is mounted to the portion of a shaft extending from the opposing side of the actuating unit or valve unit.

Although in the above described embodiments the shaft locking device is described in relation to a valve assembly, it will be appreciated that the above arrangement is not limited thereto and the shaft locking device may be used to lock any rotating shaft.

It will be appreciated that the foregoing description is given by way of example only, and that modifications may be made to embodiments of the present invention without departing from the scope of the appended claims.

The invention claimed is:

1. A shaft locking device, comprising a locking element configured to be mounted on a shaft in a first position so that the locking element is free to rotate with the shaft, wherein the locking element is configured to be mounted on the shaft in a second position so that the locking element is locatable against a stop to prevent rotation of the shaft, wherein the locking element comprising a locking portion configured to locate against said stop to prevent rotation of the shaft, wherein the radial distance from the rotational axis of the shaft and the locking portion when the locking element is configured to be mounted on the shaft in its first position is less than the radial distance from the rotational axis of the shaft and the locking portion when the locking element is configured to be mounted on the shaft in its second position.

2. A shaft locking device according to claim 1, wherein the locking element comprises a shaft mounting collar to mount the locking element in the first position.

3. A shaft locking device according to claim 2, wherein the shaft mounting collar is a first shaft mounting collar, and the locking element further comprises a second shaft mounting collar to mount the locking element in the second position.

4. A shaft locking device according to claim 3, wherein the second shaft mounting collar is disposed on an opposing side of the first shaft mounting collar to the locking portion.

5. A shaft locking device according to claim 3, wherein the locking element further comprises a body forming the first and second shaft mounting collars and the locking portion extends from said body.

6. A shaft locking device according to claim 5, wherein the distance between the locking portion and the first shaft mounting collar is less than the distance between the locking portion and the second shaft mounting collar.

7. A shaft locking device according to claim 2, wherein the shaft mounting collar is a first shaft mounting collar further comprising a rotation prevention element configured to prevent rotation of the locking element relative to the shaft when the locking element is mounted on the shaft in the first position.

8. A shaft locking device according to claim 7, wherein a second shaft mounting collar further comprises a rotation prevention element configured to prevent rotation of the shaft relative to the locking element when the locking element is mounted on the shaft in the second position.

9. A shaft locking device according to claim 7, wherein the rotation prevention element is a spline.

10. A shaft locking device according to claim 1, wherein the locking portion is an indicator element configured to indicate the angular position of the shaft when the locking element is in its first position.

11. A device for determining angular position of a shaft comprising a shaft locking device according to claim 1.

12. A device according to claim 11, wherein the locking element is configured to act as an indicator element to indicate the angular position of the shaft when the locking element is mounted to the shaft in said first position.

13. An actuating unit for actuating a valve comprising a drive unit, a rotatable shaft for actuating said valve and a shaft locking device according to claim 1.

14. A valve assembly comprising a valve, a shaft for actuating the valve and a shaft locking device according to claim 1.

15. A valve assembly according to claim 14, further comprising a drive unit to drive the shaft.

16. A valve assembly comprising a valve, a shaft for actuating the valve, a locking element mountable to the shaft and a stop, wherein the locking element is configured to be mounted on the shaft in a first position so that the locking element is free to rotate with the shaft, and is configured to be mounted to the shaft in a second position so that the locking element is locatable against the stop to prevent rotation of the shaft and maintain the valve in a pre-determined operating position, wherein the locking element comprising a locking portion configured to locate against said stop to prevent rotation of the shaft, wherein the radial distance from the rotational axis of the shaft and the locking portion when the locking element is configured to be mounted on the shaft in its first position is less than the radial distance from the rotational axis of the shaft and the locking portion when the locking element is configured to be mounted on the shaft in its second position.

17. A valve assembly according to claim 16, further comprising a housing, wherein the stop is formed on the housing.

18. A valve assembly according to claim 16, wherein the stop comprises a lug against which the locking element is locatable.

\* \* \* \* \*